United States Patent
Mitsunobu et al.

(10) Patent No.: US 11,814,732 B2
(45) Date of Patent: Nov. 14, 2023

(54) HOT-DIP PLATED STEEL

(71) Applicant: NIPPON STEEL CORPORATION, Tokyo (JP)

(72) Inventors: Takuya Mitsunobu, Tokyo (JP); Mamoru Saito, Tokyo (JP); Kohei Tokuda, Tokyo (JP); Hiroshi Takebayashi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 18/009,015

(22) PCT Filed: Sep. 7, 2021

(86) PCT No.: PCT/JP2021/032749
§ 371 (c)(1),
(2) Date: Dec. 8, 2022

(87) PCT Pub. No.: WO2023/037396
PCT Pub. Date: Mar. 16, 2023

(65) Prior Publication Data
US 2023/0203635 A1   Jun. 29, 2023

(51) Int. Cl.
*C23C 2/06* (2006.01)
*C23C 2/28* (2006.01)
(Continued)

(52) U.S. Cl.
CPC .............. *C23C 2/06* (2013.01); *B32B 15/013* (2013.01); *B32B 15/016* (2013.01); *B32B 15/04* (2013.01);
(Continued)

(58) Field of Classification Search
CPC ... C23C 28/3225; C23C 28/025; C23C 30/00; C23C 30/005; C23C 2/06; C23C 2/2628;
(Continued)

(56) References Cited

U.S. PATENT DOCUMENTS

2019/0010595 A1  1/2019 Oh et al.
2019/0390303 A1  12/2019 Tokuda et al.
(Continued)

FOREIGN PATENT DOCUMENTS

CN    110234780 A    9/2019
EP    3992323 A1    5/2022
(Continued)

OTHER PUBLICATIONS

Yu Kang-cai, et al., "Microstructure of Hot-Dip Galvanized Zn—Al—Mg Alloy Coating," in J. Shanghai Jiaotong Univ. (Sci.), 2012, 17(6): 663-667 (no month). (Year: 2012).*

(Continued)

*Primary Examiner* — Michael E. La Villa
(74) *Attorney, Agent, or Firm* — Renner, Otto, Boisselle & Sklar, LLP

(57) ABSTRACT

A hot-dip plated steel includes a base steel and a hot-dip plating layer on a surface of the base steel, a chemical composition of the hot-dip plating layer contains, by mass %, Al: 10.00% to 30.00%, Mg: 3.00% to 12.00%, Sn: 0% to 2.00%, Si: 0% to 2.50%, Ca: 0% to 3.00%, Ni: 0% or more and less than 0.25%, Fe: 0% to 5.00%, and the like, a remainder includes Zn and impurities, a metallographic structure of the hot-dip plating layer contains 5 to 45 area % of an α phase having a grain diameter of 0.5 to 2 μm, the metallographic structure of the hot-dip plating layer contains 15 to 70 area % of a $MgZn_2$ phase, and, among the α phases having the grain diameter of 0.5 to 2 μm, an area ratio of an α phase having a (111)α//(0001)$MgZn_2$ orientation relationship to the adjacent $MgZn_2$ phase is 25% to 100%.

4 Claims, 1 Drawing Sheet

(51) Int. Cl.
*C22C 18/04* (2006.01)
*B32B 15/01* (2006.01)
*B32B 15/04* (2006.01)
*B32B 15/18* (2006.01)
*C22C 18/00* (2006.01)
*C23C 2/26* (2006.01)
*C23C 28/02* (2006.01)
*C23C 28/00* (2006.01)
*C23C 30/00* (2006.01)
*C21D 1/26* (2006.01)
*C21D 8/02* (2006.01)
*C21D 9/46* (2006.01)

(52) U.S. Cl.
CPC ............ *B32B 15/043* (2013.01); *B32B 15/18* (2013.01); *C21D 1/26* (2013.01); *C21D 8/0278* (2013.01); *C21D 9/46* (2013.01); *C22C 18/00* (2013.01); *C22C 18/04* (2013.01); *C23C 2/26* (2013.01); *C23C 2/28* (2013.01); *C23C 2/29* (2022.08); *C23C 28/025* (2013.01); *C23C 28/3225* (2013.01); *C23C 30/00* (2013.01); *C23C 30/005* (2013.01); *Y10T 428/12792* (2015.01); *Y10T 428/12799* (2015.01); *Y10T 428/12972* (2015.01); *Y10T 428/26* (2015.01)

(58) Field of Classification Search
CPC .......... C23C 2/29; C22C 18/04; C22C 18/00; B32B 15/016; B32B 15/013; B32B 15/04; B32B 15/043; B32B 15/18; Y10T 428/12799; Y10T 428/12792; Y10T 428/12972; Y10T 428/26; C21D 1/26; C21D 8/0278; C21D 9/46
See application file for complete search history.

(56) References Cited

U.S. PATENT DOCUMENTS

| | | |
|---|---|---|
| 2020/0002798 A1 | 1/2020 | Tokuda et al. |
| 2020/0017937 A1 | 1/2020 | Mitsunobu |
| 2021/0010106 A1 | 1/2021 | Kim et al. |
| 2021/0147971 A1 | 5/2021 | Harada et al. |
| 2021/0198780 A1 | 7/2021 | Mitsunobu |
| 2022/0145425 A1 | 5/2022 | Mitsunobu et al. |

FOREIGN PATENT DOCUMENTS

| | | |
|---|---|---|
| JP | 2019-501296 A | 1/2019 |
| JP | 2021-508779 A | 3/2021 |
| JP | 2021-085088 A | 6/2021 |
| WO | 2018/139619 A1 | 8/2018 |
| WO | 2018/139620 A1 | 8/2018 |
| WO | 2018/169085 A1 | 9/2018 |
| WO | 2019/009003 A1 | 1/2019 |
| WO | 2019/130534 A1 | 7/2019 |
| WO | 2019/221193 A1 | 11/2019 |
| WO | 2020/213686 A1 | 10/2020 |
| WO | 2020/261723 A1 | 12/2020 |

OTHER PUBLICATIONS

Notice of Allowance for corresponding Japanese Patent App. No. 2022-504124, dated Mar. 8, 2022.

* cited by examiner

HOT-DIP PLATED STEEL

TECHNICAL FIELD OF THE INVENTION

The present invention relates to a hot-dip plated steel.

BACKGROUND ART

Steels having a hot-dip galvanized layer containing Al and Mg formed on a surface (hot-dip Zn—Al—Mg-based plated steel) have excellent corrosion resistance. Therefore, hot-dip Zn—Al—Mg-based plated steels are in wide use as materials for structural members that require corrosion resistance such as building materials.

For example, Patent Document 1 discloses a plated steel having a steel and a plating layer including a Zn—Al—Mg alloy layer disposed on a surface of the steel, in which the plating layer has a predetermined chemical composition, in a reflected electron image of the Zn—Al—Mg alloy layer that is obtained by observing a surface of the Zn—Al—Mg alloy layer polished up to ½ of the layer thickness with a scanning electron microscope at a magnification of 100 times, Al crystals are present, and the average value of the cumulative perimeters of the Al crystals is 88 to 195 mm/mm$^2$.

Patent document 2 discloses a plated steel sheet having a steel sheet and a plating layer formed on at least a part of a surface of the steel sheet, in which the chemical composition of the plating layer contains, by mass %, Al: more than 5.00% and 35.00% or less, Mg: 3.00% to 15.00%, Si: 0% to 2.00%, Ca: 0% to 2.00%, and a remainder consisting of Zn and impurities, in a cross section of the plating layer in the thickness direction, the area ratio of a lamellar structure in which a (Al—Zn) phase and a MgZn$_2$ phase are arranged in layers is 10% to 90%, and the lamellar spacing of the lamellar structure is 2.5 μm or less, and the area ratio of (Al—Zn) dendrites is 35% or less.

PRIOR ART DOCUMENT

Patent Document

[Patent Document 1] PCT International Publication No. WO 2019/221193

[Patent Document 2] PCT International Publication No. WO 2020/213686

DISCLOSURE OF THE INVENTION

Problems to be Solved by the Invention

In recent years, hot-dip Zn—Al—Mg-based plated steels are also required to have corrosion resistance under running water. Corrosion resistance under running water is corrosion resistance in a state of being exposed to running water. In a running water environment, a corrosion product attached to the surface of a hot-dip plating layer is washed away, and the antirust effect of the corrosion product is impaired. Therefore, the corrosion resistance under running water of steels is evaluated by means different from that for normal corrosion resistance. For example, materials that are used as a material for the wall surfaces of irrigation channels through which rainwater, industrial water, and the like flow at all time are required to have high corrosion resistance under running water.

In the prior art, studies have been rarely made regarding corrosion resistance under running water. For example, in Patent Document 1, the flat portion corrosion resistance was evaluated according to JASO M609-91, and, in this evaluation, a corrosive solution was assumed to be in a no-flow state. Therefore, in Patent Document 1, corrosion resistance under running water is neither studied nor evaluated. In Patent Document 2 as well, corrosion resistance after painting is evaluated in a no-running water environment, and corrosion resistance under running water is neither studied nor evaluated.

Furthermore, as a result of studies, the present inventors found that even normal hot-dip Zn—Al—Mg-based plated steels having high corrosion resistance as disclosed in Patent Documents 1 and 2 cannot be said to have sufficient corrosion resistance under running water. For example, in Patent Document 1, in a temperature range from a plating solidification start temperature to the plating solidification start temperature −30° C., cooling is carried out at an average cooling rate of 12° C./s or slower. The present inventors found that, in a hot-dip plating obtained under such cooling conditions, the interface between an α phase and the MgZn$_2$ phase is likely to corrode under a running water environment as described below. In addition, in Patent Document 2, a plating original sheet after the stop of controlled cooling is cooled to 335° C. or lower such that the average cooling rate becomes 5° C./sec or slower; however, in a temperature range of 335° C. or lower, the control of cooling intended for the microstructure control of the plating layer is not carried out. The present inventors found that, in a hot-dip plating obtained under such cooling conditions, a η phase crystallizes from an α phase, and corrosion is likely to occur at the interface between the α phase and the η phase and at the interface between the α phase and the MgZn$_2$ phase, and the corrosion resistance under running water is impaired.

In addition, in order to improve the corrosion resistance of hot-dip Zn—Al—Mg-based plated steels, addition of a high concentration of Mg to plating is effective; however, in a case where such a high concentration of Mg has been added to plating, there is another problem in that powdering is likely to occur. Powdering is a phenomenon in which a hot-dip plating layer exfoliates and becomes powdery during the press forming of a hot-dip Zn—Al—Mg-based plated steel. In order to use hot-dip Zn—Al—Mg-based plated steels as materials for a variety of structural components, powdering resistance is also required.

In view of the above circumstances, an object of the present invention is to provide a hot-dip plated steel being excellent in terms of powdering resistance and corrosion resistance under running water.

Means for Solving the Problem

The gist of the present invention is as described below.

(1) A hot-dip plated steel according to one aspect of the present invention includes a base steel and a hot-dip plating layer disposed on a surface of the base steel, a chemical composition of the hot-dip plating layer contains, by mass %, Al: 10.00% to 30.00%, Mg: 3.00% to 12.00%, Sn: 0% to 2.00%, Si: 0% to 2.50%, Ca: 0% to 3.00%, Ni: 0% or more and less than 0.25%, Cr: 0% or more and less than 0.25%, Ti: 0% or more and less than 0.25%, Co: 0% or more and less than 0.25%, V: 0% or more and less than 0.25%, Nb: 0% or more and less than 0.25%, Cu: 0% or more and less than 0.25%, Mn: 0% or more and less than 0.25%, Bi: 0% or more and less than 5.000%, In: 0% or more and less than 2.00%, Y: 0% to 0.50%, La: 0% or more and less than 0.50%, Ce: 0% or more and less than 0.50%, Fe: 0% to 5.00%, Sr: 0% or more and less than 0.50%, Sb: 0% or more and less than 0.50%, Pb: 0% or more and less than 0.50%, and B: 0% or more and less than 0.50%, a remainder consists of Zn and impurities, a metallographic structure of the hot-dip plating layer contains 5 to 45 area % of an α phase having a grain diameter of 0.5 to 2 the metallographic structure of the hot-dip plating layer contains 15 to 70 area % of a $MgZn_2$ phase, and, among the α phases having the grain diameter of 0.5 to 2 μm, an area ratio of the α phase having a $(111)_\alpha//(0001)_{MgZn2}$ orientation relationship to the adjacent $MgZn_2$ phase is 25% to 100%.

(2) In the hot-dip plated steel according to (1), among the α phases having the grain diameter of 0.5 to 2 μm, the area ratio of the α phase having the $(111)_\alpha//(0001)_{MgZn2}$ orientation relationship to the adjacent $MgZn_2$ phase may be 60% to 100%.

(3) In the hot-dip plated steel according to (1) or (2), the chemical composition of the hot-dip plating layer may be, by mass %, Mg: 5.00% to 8.00% and Sn: 0.05% to 2.00%.

Effects of the Invention

According to the present invention, it is possible to provide a hot-dip plated steel being excellent in terms of powdering resistance and corrosion resistance under running water.

EMBODIMENTS OF THE INVENTION

Figure 1:
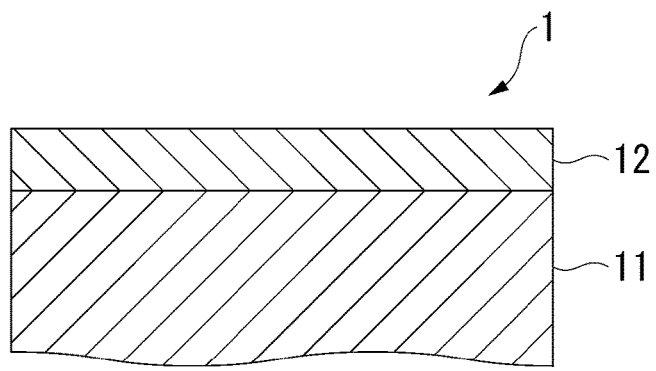
FIG. 1 is a cross-sectional view of a hot-dip plated steel according to one aspect of the present invention.

The present inventors repeated studies regarding means for enhancing the corrosion resistance under running water of hot-dip plated steels. In addition, the present inventors focused on the crystal orientation relationship between an α phase and a $MgZn_2$ phase on the surface of a hot-dip plating layer.

A hot-dip plating layer composed of a Zn—Al—Mg-based alloy contains an α phase and a $MgZn_2$ phase. The α phase is a solid solution having a crystal structure with face centered cubic lattices whose chemical composition is mainly composed of Al and Zn. In a case where Mg, Ni, Fe, Sn, and the like are added to the plating layer as elements other than Al and Zn, the α phase may contain 0.5% or less of each of these elements. The α phase is mainly composed of Al and thus can be passivated and has an effect of improving the flat portion corrosion resistance of the plating layer. Furthermore, the α phase also has high plastic deformability attributed to its crystal structure and thus also has an effect of improving powdering resistance. The $MgZn_2$ phase is an intermetallic compound phase whose chemical composition is mainly composed of Mg and Zn. The $MgZn_2$ phase is potentially base in corrosive environments and thus has sacrificial protection resistance to base metals and improves the flat portion corrosion resistance and sacrificial protection resistance of the hot-dip plating layer by turning a Zn-based corrosive product into an insulating film by Mg.

The present inventors found that corrosion is likely to occur at the interface between the α phase and the $MgZn_2$ phase. The natural potential of the α phase is higher than the natural potential of the $MgZn_2$ phase. Therefore, at the interface between the α phase and the $MgZn_2$ phase, galvanic corrosion occurs.

In the conventional evaluation of the flat portion corrosion resistance in non-running water environments, corrosion at the interface between the α phase and the $MgZn_2$ phase was not regarded as a problem. The reason for this is considered to be that, in non-running water environments, a corrosion product generated at the interface between the α phase and the $MgZn_2$ phase attaches to the surface of a hot-dip plating layer and exhibits an antirust effect. However, in running water environments where a corrosion product is washed away from the surface of a hot-dip plating layer, the antirust effect of the corrosion product cannot be obtained. Therefore, corrosion occurring at the interface between the α phase and the $MgZn_2$ phase is considered to impair corrosion resistance under running water.

In addition, the present inventors found that corrosion resistance at the interface between the α phase and the $MgZn_2$ phase can be enhanced by setting the crystal orientation relationship between the α phase and the $MgZn_2$ phase within a specific range. In addition, the present inventors found that the corrosion resistance under running water of hot-dip plated steels can be enhanced by enhancing, in addition to the flat portion corrosion resistance, which has been focused conventionally, the corrosion resistance at the interface between the α phase and the $MgZn_2$ phase.

A hot-dip plated steel according to one embodiment of the present invention and a manufacturing method thereof obtained based on the above findings will be described in detail below. Hereinafter, the mark "%" for the content of each element in the chemical composition means "mass %". The content of an element in the chemical composition may be expressed as an element concentration (for example, a Zn concentration, a Mg concentration, or the like). The term "flat portion corrosion resistance" refers to a property of a hot-dip plating layer (specifically, a Zn—Al—Mg alloy layer) itself being not easily corroded. The term "sacrificial protection resistance" refers to a property of suppressing the corrosion of a base steel at uncovered portions of the base steel (for example, a cut end face portion of a plated steel, a cracked portion in a hot-dip plating layer during processing, and a place where the base steel is exposed due to the exfoliation of the hot-dip plating layer). The term "corrosion resistance under running water" refers to a property of the hot-dip plating layer itself being not easily corroded in running water environments where a corrosion product on the surface of the plated steel is washed away. The term "hot-dip plating layer" means a plating coating manufactured by a so-called hot-dip galvanizing treatment.

A hot-dip plated steel 1 according to the present embodiment has a base steel 11. The shape of the base steel is not particularly limited, and one example of the base steel is a steel sheet. In addition, the base steel may be, for example, a formed base steel such as a steel pipe, a civil engineering and construction material (a fence, a corrugated pipe, a drain cover, a flying sand prevention plate, a bolt, a wire mesh, a guardrail, a cut-off wall, or the like), a home appliance member (a housing of an outdoor unit for air conditioners or the like), or a vehicle component (a suspension member or the like). Forming is, for example, a variety of deformation processing methods such as pressing, roll forming, and bending.

The material of the base steel is not particularly limited. As the base steel, it is possible to use a variety of base steels, for example, general steel, pre-plated steel, Al-killed steel, ultra-low carbon steel, high carbon steel, a variety of high tensile strength steels, and some of high alloy steels (steels containing a strengthening element such as Ni or Cr and the like). As the base steel, a hot-rolled steel sheet, a hot-rolled steel strip, a cold-rolled steel sheet, a cold-rolled steel strip, or the like described in JIS G 3302:2010 may be used. A method for manufacturing the base steel sheet (a hot rolling method, a pickling method, a cold rolling method, or the like), specific manufacturing conditions thereof, and the like are also not particularly limited.

The base steel may be a pre-plated steel that has been pre-plated. The pre-plated steel can be obtained by, for example, an electrolytic treatment or displacement plating. The electrolytic treatment is carried out by immersing the base steel in a sulfuric acid bath or a chloride bath containing the metal ions of a variety of pre-plating composition and carrying out the electrolytic treatment. The displacement plating is carried out by immersing the base steel in an aqueous solution containing the metal ions of a variety of pre-plating composition and having a pH adjusted with sulfuric acid to cause the displacement precipitation of metals. An example of the pre-plated steel is a Ni pre-plated steel.

The hot-dip plated steel 1 according to the present embodiment has a hot-dip plating layer 12 disposed on the surface of the base steel. The hot-dip plating layer of the hot-dip plated steel according to the present embodiment is mainly composed of a Zn—Al—Mg alloy layer due to a chemical composition to be described below. In addition, the hot-dip plating layer of the hot-dip plated steel according to the present embodiment may include an Al—Fe alloy layer between the base steel and the Zn—Al—Mg alloy layer. That is, the hot-dip plating layer may have a single-layer structure of the Zn—Al—Mg alloy layer or may have a laminated structure including the Zn—Al—Mg alloy layer and the Al—Fe alloy layer.

The chemical composition of the hot-dip plating layer according to the present embodiment is composed of Zn and other alloying elements. The chemical composition of the hot-dip plating layer will be described in detail below. An element for which the lower limit of the concentration is described to be 0% is an arbitrary element that is not essential for solving the problem of the hot-dip plated steel according to the present embodiment, but is contained in the hot-dip plating layer for the purpose of improving properties or the like.

<Al: 10.00% to 30.00%>

Al forms an α phase that is a solid solution with Zn and contributes to improvement in flat portion corrosion resistance, sacrificial protection resistance, corrosion resistance under running water, and workability. Therefore, the Al concentration is set to 10.00% or more. The Al concentration may be set to 11.00% or more, 12.00% or more, or 15.00% or more.

On the other hand, in a case where there is an excess of Al, a crystallizes ahead of $MgZn_2$. In addition, a grows without satisfying a crystal orientation relationship with a $MgZn_2$ phase. As a result, a sufficient amount of a structure that satisfies the $\alpha/MgZn_2$ crystal orientation relationship is not formed, and thus the corrosion resistance under running water deteriorates. Therefore, the Al concentration is set to 30.00% or less. The Al concentration may be set to 28.00% or less, 25.00% or less, or 20.00% or less.

<Mg: 3.00% to 12.00%>

Mg is an essential element for ensuring flat portion corrosion resistance, sacrificial protection resistance, and corrosion resistance under running water. Therefore, the Mg concentration is set to 3.00% or more. The Mg concentration may be set to 4.00% or more, 5.00% or more, or 6.00% or more.

On the other hand, when the Mg concentration is excessive, workability, in particular, the powdering property, deteriorates. Therefore, the Mg concentration is set to 12.00% or less. The Mg concentration may be set to 11.00% or less, 10.00% or less, 8.00% or less, less than 8.00%, or 6.00% or less.

<Sn: 0% to 2.00%>

The Sn concentration may be 0%. On the other hand, Sn is an element that forms an intermetallic compound with Mg and improves the sacrificial protection resistance of the hot-dip plating layer. Therefore, the Sn concentration may be set to 0.05% or more, 0.10% or more, 0.20% or more, or 0.50% or more.

However, when the Sn concentration is excessive, the flat portion corrosion resistance and the corrosion resistance under running water deteriorate. Therefore, the Sn concentration is set to 2.00% or less. The Sn concentration may be set to 1.80% or less, 1.50% or less, or 1.20% or less.

<Si: 0% to 2.50%>

The Si concentration may be 0%. Incidentally, Si contributes to improvement in flat portion corrosion resistance and corrosion resistance under running water. Therefore, the Si concentration may be set to 0.05% or more, 0.10% or more, 0.20% or more, or 0.50% or more.

On the other hand, when the Si concentration is excessive, the flat portion corrosion resistance, the sacrificial protection resistance, and the workability deteriorate. Therefore, the Si concentration is set to 2.50% or less. The Si concentration may be set to 2.40% or less, 1.80% or less, or 1.20% or less.

<Ca: 0% to 3.00%>

The Ca concentration may be 0%. Incidentally, Ca is an element capable of adjusting the optimum amount of Mg eluted for imparting flat portion corrosion resistance and corrosion resistance under running water. Therefore, the Ca concentration may be 0.05% or more, 0.1% or more, or 0.5% or more.

On the other hand, when the Ca concentration is excessive, the flat portion corrosion resistance, the corrosion resistance under running water, and the workability deteriorate. Therefore, the Ca concentration is set to 3.00% or less. The Ca concentration may be set to 2.40% or less, 1.80% or less, or 1.20% or less.

<Ni, Cr, Ti, Co, V, Nb, Cu, and Mn: 0% or More and Less than 0.25% Each>

The concentration of each of Ni, Cr, Ti, Co, V, Nb, Cu, and Mn may be 0%. Incidentally, these contribute to improvement in sacrificial protection resistance. Therefore, the concentration of each of Ni, Cr, Ti, Co, V, Nb, Cu, and Mn may be set to 0.05% or more, 0.08% or more, or 0.1% or more.

On the other hand, when the concentration of each of Ni, Cr, Ti, Co, V, Nb, Cu, and Mn is excessive, the flat portion corrosion resistance and the corrosion resistance under running water deteriorate. Therefore, the concentration of each of Ni, Cr, Ti, Co, V, Nb, Cu, and Mn is set to less than 0.25%. The concentration of each of Ni, Cr, Ti, Co, V, Nb, Cu, and Mn may be set to 0.22% or less, 0.20% or less, or 0.15% or less.

<Bi: 0% or More and Less than 5.000%>

The concentration of Bi may be 0%. Incidentally, Bi contributes to improvement in sacrificial protection resistance. Therefore, the Bi concentration may be set to 0.100% or more, 1.000% or more, or 3.000% or more.

On the other hand, when the Bi concentration is excessive, the flat portion corrosion resistance and the corrosion resistance under running water deteriorate. Therefore, the Bi concentration is set to less than 5.000%. The Bi concentration may be set to 4.800% or less, 4.500% or less, or 4.000% or less.

<In: 0% or More and Less than 2.00%>

The concentration of In may be 0%. Incidentally, In contributes to improvement in sacrificial protection resistance. Therefore, the In concentration may be 0.10% or more, 0.50% or more, or 1.00% or more.

On the other hand, when the In concentration is excessive, the flat portion corrosion resistance and the corrosion resistance under running water deteriorate. Therefore, the In concentration is set to less than 2.00%. The In concentration may be set to 1.80% or less, 1.50% or less, or 1.00% or less.

<Y: 0% to 0.50%>

The concentration of Y may be 0%. Incidentally, Y contributes to improvement in sacrificial protection resistance. Therefore, the Y concentration may be 0.10% or more, 0.15% or more, or 0.20% or more.

On the other hand, when the Y concentration is excessive, the flat portion corrosion resistance and the corrosion resistance under running water deteriorate. Therefore, the Y concentration is set to 0.50% or less. The Y concentration may be 0.30% or less, 0.25% or less, or 0.22% or less.

<La and Ce: 0% or More and Less than 0.50% Each>

The concentration of each of La and Ce may be 0%. Incidentally, La and Ce contribute to improvement in sacrificial protection resistance. Therefore, the La concentration and the Ce concentration may be each set to 0.10% or more, 0.15% or more, or 0.20% or more.

On the other hand, when the La concentration and the Ce concentration are excessive, the flat portion corrosion resistance and the corrosion resistance under running water deteriorate. Therefore, the La concentration and the Ce concentration are each set to less than 0.50%. The La concentration and the Ce concentration may be each set to 0.40% or less, 0.30% or less, or 0.25% or less.

<Fe: 0% to 5.00%>

The concentration of Fe may be 0%. On the other hand, Fe may be contained in the hot-dip plating layer. It has been confirmed that, when the Fe concentration is 5.00% or less, there is no adverse influence on the performance of the hot-dip plating layer. The Fe concentration may be set to, for example, 0.05% or more, 0.10% or more, 0.50% or more, or 1.00% or more. The Fe concentration may be set to, for example, 4.00% or less, 3.50% or less, or 3.00% or less. Since there are cases where Fe is incorporated from a base steel sheet, the Fe concentration may be 0.05% or more.

<Sr, Sb, Pb, and B: 0% or More and Less than 0.50% Each>

The concentration of each of Sr, Sb, Pb, and B may be 0%. Incidentally, Sr, Sb, Pb, and B contribute to improvement in sacrificial protection resistance. Therefore, the concentration of each of Sr, Sb, Pb, and B may be set to 0.05% or more, 0.10% or more, or 0.15% or more.

On the other hand, when the concentration of each of Sr, Sb, Pb, and B is excessive, the flat portion corrosion resistance and the corrosion resistance under running water deteriorate. Therefore, the concentration of each of Sr, Sb, Pb, and B is set to less than 0.50%. The concentration of each of Sr, Sb, Pb, and B may be set to 0.40% or less, 0.30% or less, or 0.25% or less.

<Remainder: Zn and Impurities>

The remainder of the composition of the hot-dip plating layer according to the present embodiment is Zn and impurities. Zn is an element that brings flat portion corrosion resistance and sacrificial protection resistance to the hot-dip plating layer. Impurities refer to components that are contained in raw materials or components that are incorporated in manufacturing steps and components that are not intentionally contained. For example, in the hot-dip plating layer, there are cases where a small amount of components other than Fe are incorporated as impurities due to mutual atomic diffusion between the base steel and a plating bath.

The chemical composition of the hot-dip plating layer is measured by the following method. First, an acid solution is obtained by exfoliating and dissolving the hot-dip plating layer using an acid containing an inhibitor that suppresses the corrosion of the base steel. Next, the obtained acid solution is ICP-analyzed. This makes it possible to obtain the chemical composition of the hot-dip plating layer. The acid species is not particularly limited as long as the acid species is an acid capable of dissolving the hot-dip plating layer. The chemical composition that is measured by the above-described method is the average chemical composition of the entire hot-dip plating layer.

Next, the metallographic structure of the hot-dip plating layer will be described.

<α Phase>

The metallographic structure of the hot-dip plating layer 12 contains 5 to 45 area % of an α phase having a grain diameter of 0.5 to 2 μm. This area ratio is the area ratio of the α phase having a grain diameter of 0.5 to 2 μm to all phases that configure the hot-dip plating layer 12.

The α phase having a grain diameter of 0.5 to 2 μm improves the flat portion corrosion resistance and powdering resistance of the hot-dip plating layer. However, in a case where the amount of the α phase having a grain diameter of 0.5 to 2 μm is less than 5 area %, these effects cannot be obtained. Therefore, the amount of the α phase having a grain diameter of 0.5 to 2 μm is set to 5 area % or more. The amount of α phase having a grain diameter of 0.5 to 2 μm may be set to 6 area % or more, 8 area % or more, or 10 area % or more.

On the other hand, in a case where the amount of the α phase having a grain diameter of 0.5 to 2 μm is more than 45 area %, the amount of the α phase becomes excessive with respect to the $MgZn_2$ phase. Therefore, the α phase grows in a state of not being adjacent to the $MgZn_2$ phase, as a result, it becomes difficult to form a crystal orientation relationship at the interface between the α phase and the $MgZn_2$ phase, and the corrosion resistance under running water deteriorates. Therefore, the amount of the α phase having a grain diameter of 0.5 to 2 μm is set to 45 area % or less. The amount of the α phase having a grain diameter of 0.5 to 2 μm may be set to 42 area % or less, 40 area % or less, or 35 area % or less.

The area ratios of an α phase having a grain diameter of less than 0.5 μm and the area ratio of an α phase having a grain diameter of more than 2 μm are not particularly limited as long as the area ratio of the α phase having a grain diameter of 0.5 to 2 μm is within the above-described range. At the tune of evaluating the structure of the hot-dip plating layer, the area ratios of the α phase having a grain diameter of less than 0.5 μm and the α phase having a grain diameter of more than 2 are ignored.

<$MgZn_2$ Phase>

The $MgZn_2$ phase improves the flat portion corrosion resistance, corrosion resistance under running water, and powdering resistance of the hot-dip plating layer 12. However, in a case where the amount of the $MgZn_2$ phase is less than 15 area %, these effects cannot be obtained. Therefore, the amount of the MgZn$_2$ phase is set to 15 area % or more. The amount of the MgZn$_2$ phase may be set to 18 area % or more, 20 area % or more, or 25 area % or more.

On the other hand, in a case where the amount of the MgZn$_2$ phase is more than 70 area %, the powdering resistance of the hot-dip plated steel is impaired. This is because the MgZn$_2$ phase is brittle. Therefore, the amount of the MgZn$_2$ phase is set to 70 area % or less. The amount of the MgZn$_2$ phase may be set to 65 area % or less, 60 area % or less, or 50 area % or less.

The hot-dip plating layer 12 may contain phases other than the α phase and the MgZn$_2$ phase. For example, the hot-dip plating layer having the above-described chemical composition, a Mg$_2$Sn phase, an α/η/MgZn$_2$ ternary eutectic structure, an η-Zn phase, an Al—Ca—Si phase, and the like may be contained. As long as the contents of the α phase and the MgZn$_2$ phase are within the above-described ranges, it is possible to ensure corrosion resistance under running water and powdering resistance, and thus the configuration of phases other than the α phase and the MgZn$_2$ phase is not particularly limited.

<Interface Between α Phase and MgZn$_2$ Phase>

The natural potential of the α phase is higher than the natural potential of the MgZn$_2$ phase. Therefore, at the interface between the α phase and the MgZn$_2$ phase, galvanic corrosion occurs. This becomes particularly significant in a case where the amount of the α phase having a grain diameter of 0.5 to 2 μm is 5 area % or more. This is because the length of the interface of the α phase that is exposed to a running water environment increases when the amount of a fine α phase having a grain diameter of 2 km or less increases. In order to improve the corrosion resistance under running water of the hot-dip plated steel, it is necessary to increase the corrosion resistance at the interface between the α phase and the MgZn$_2$ phase.

For the above reasons, in the hot-dip plating layer of the hot-dip plated steel according to the present embodiment, among the α phases having a grain diameter of 0.5 to 2 μm, the area ratio of an α phase having a $(111)_\alpha//(0001)_{MgZn2}$ orientation relationship to the adjacent MgZn$_2$ phase is set to 25% to 100%. In other words, in the hot-dip plating layer of the hot-dip plated steel according to the present embodiment, the following formula is satisfied.

$$0.25 \leq A2/A1 \leq 1.00$$

A1: The area of the α phase having a grain diameter of 0.5 to 2 μm, which is measured in a cross section of the hot-dip plating layer A2: The area of the α phase having a grain diameter of 0.5 to 2 μm, which is measured in the cross section of the hot-dip plating layer, and having the $(111)_\alpha//(0001)_{MgZn2}$ orientation relationship with the adjacent MgZn$_2$ phase Here, "the α phase having the $(111)_\alpha//(0001)_{MgZn2}$ orientation relationship with the adjacent MgZn$_2$ phase" refers to an α phase that is adjacent to the MgZn$_2$ phase and in which a (111) plane of the α phase and a (0001) plane of the adjacent MgZn$_2$ phase are parallel to each other.

In a case where there is the $(111)_\alpha//(0001)_{MgZn2}$ orientation relationship between the α phase and the MgZn$_2$ phase adjacent thereto, the interface between these phases is chemically stable and has high corrosion resistance. Therefore, when the amount of the α phase having the $(111)_\alpha//(0001)_{MgZn2}$ orientation relationship increases, it is possible to suppress corrosion at the phase interface and enhance the corrosion resistance under running water. For the above reason, A2/A1 is set to 0.25 or more. A2/A1 may be set to 0.35 or more, 0.50 or more, or 0.60 or more. Since A2/A1 is preferably as high as possible, A2/A1 may be 1.00. On the other hand, A2/A1 may also be 0.95 or less, 0.90 or less, or 0.85 or less.

Figure 2:
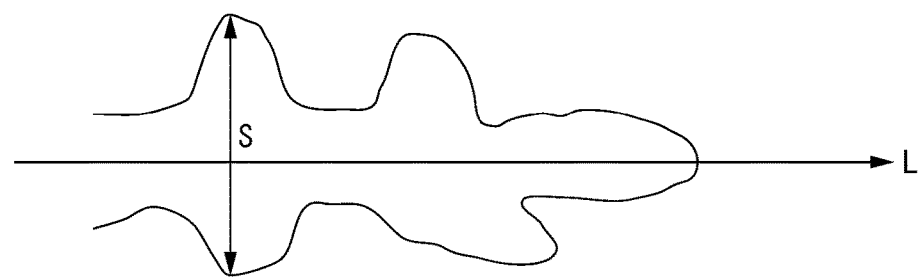
FIG. 2 is a schematic view of an α phase having a dendrite shape.

A method for measuring the area ratio of the α phase having a grain diameter of 0.5 to 2 μm is as described below. The surface of the plating layer of a sample cut to 30 mm×30 mm is adjusted to be flat by mechanical polishing. Next, the surface of the plating layer is chemically polished by colloidal polishing and is polished until this surface falls into a mirror surface state. The surface of the plating layer after the polishing is observed with a scanning electron microscope (SEM). Specifically, an element distribution image is captured using SEM-EDS at a magnification of 5000 times. In this element distribution image, phases where Al and Zn coexist are specified as the α phases. After the α phases are specified, an α phase having a grain diameter of 0.5 to 2 μm is selected from the α phases that are contained in the visual field. After that, the area ratio of the α phase having a grain diameter of 0.5 to 2 μm is calculated by binarization for which image analysis software is used. Regarding an α phase having a granular shape, the grain diameter of the α phase refers to the equivalent circle diameter. In addition, regarding a dendrically grown α phase, the grain diameter of the α phase refers to the minor axis of a dendrite. The minor axis of the dendrite is the maximum value of dendrite widths that are measured in a direction orthogonal to the major axis direction of the dendrite as shown in FIG. 2.

A method for measuring the area ratio of the MgZn$_2$ phase is as described below. The surface of the plating layer of a sample cut to 30 mm×30 mm is adjusted to be flat by mechanical polishing. Next, the surface of the plating layer is chemically polished by colloidal polishing and is polished until this surface falls into a mirror surface state. The surface of the plating layer after the polishing is observed with a scanning electron microscope (SEM). Specifically, an element distribution image is captured using SEM-EDS at a magnification of 5000 times. In this element distribution image, phases where Mg and Zn coexist are specified as the MgZn$_2$ phases. After the MgZn$_2$ phases are specified, the area ratio of the MgZn$_2$ phases that are contained in the visual field is calculated by binarization for which image analysis software is used.

A method for measuring the area ratio of the α phase having the $(111)_\alpha//(0001)_{MgZn2}$ orientation relationship to the adjacent MgZn$_2$ phase among the α phases having a grain diameter of 0.5 to 2 μm is as described below.

First, the surface of the plating layer is mirror-polished and chemically polished as necessary. Next, the polished surface is observed with SEM at a magnification of 5000 times. In addition, five visual fields where the α phase having a grain diameter of 0.5 to 2 μm can be visually recognized in an area ratio of 5% or more are selected. Crystal orientation analysis is carried out using EBSD on these visual fields. In addition, a (111) pole figure of the α phase and a (0001) pole figure of the MgZn$_2$ phase are obtained. These pole figures are compared, and a crystal orientation where the orientations of the α phase and the MgZn$_2$ phase match is selected.

A crystal orientation where the crystal orientation pole figures match can be specified by the above procedure. An α phase having a crystal orientation within ±10° from this crystal orientation in the measurement system is shown on an IPF map. The image of this IPF map is binarized and image-analyzed, whereby it is possible to calculate the area ratio of the α phase having a crystal orientation within ±10° from the crystal orientation where the orientations of the α phase and the $MgZn_2$ phase match and having a grain diameter of 0.5 to 2 μm to the α phase having a grain diameter of 0.5 to 2 mm in the observed visual fields.

The other constitutions of the hot-dip plating layer are not particularly limited as long as the area ratio of the α phase, the area ratio of the $MgZn_2$ phase, and the interface state between the α phase and the $MgZn_2$ phase are within the above-described ranges. The configuration of a normal hot-dip plated steel can be appropriately adopted for the hot-dip plating layer of the hot-dip plated steel according to the present embodiment. An example of a preferable configuration of the hot-dip plating layer as described below.

The amount of the hot-dip plating layer attached per surface is preferably set to, for example, within a range of 20 to 150 $g/m^2$. When the amount of the hot-dip plating layer attached per surface is set to 20 $g/m^2$ or more, it is possible to further enhance the corrosion resistance under running water of the hot-dip plated steel. On the other hand, when the amount of the hot-dip plating layer attached per surface is set to 150 $g/m^2$ or less, it is possible to further enhance the workability of the hot-dip plated steel.

A method for manufacturing a hot-dip plated steel according to the present embodiment is not particularly limited. For example, according to manufacturing conditions to be described below, the hot-dip plated steel according to the present embodiment can be obtained.

Figure 3:
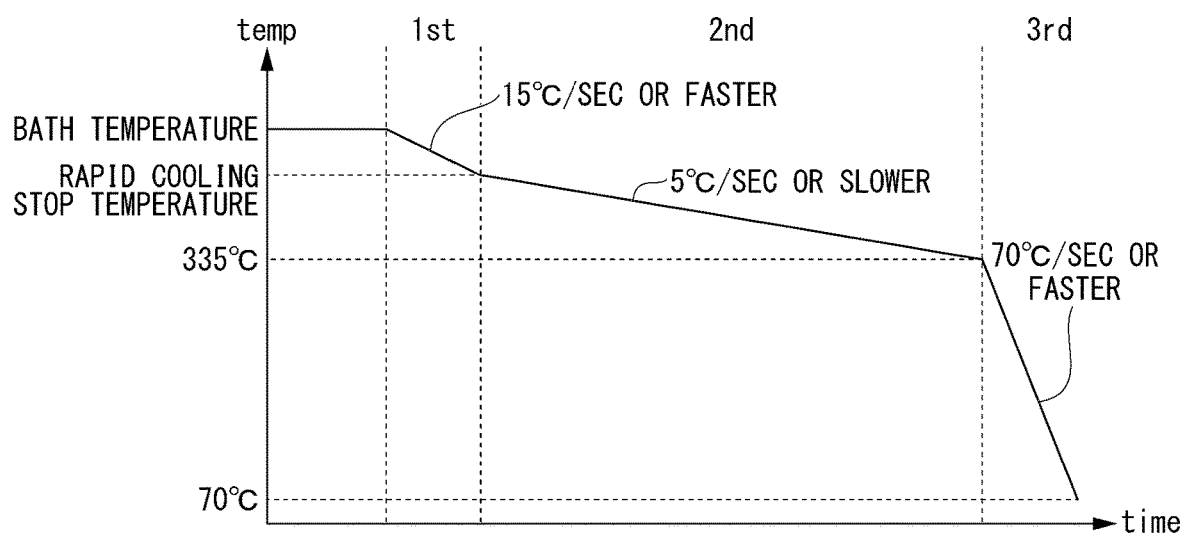
FIG. 3 is a schematic view of cooling conditions in manufacturing of a hot-dip plated steel according to one aspect of the present invention.

The method for manufacturing a hot-dip plated steel according to the present embodiment includes
a step of immersing a base steel in a hot-dip plating bath and then lifting the base steel to attach a hot-dip plating layer to the surface of the base steel and
a step of cooling the hot-dip plating layer, and
the cooling includes, as shown in FIG. 3,
first cooling of rapidly cooling the hot-dip plating layer immediately after being lifted from the hot-dip plating bath to a rapid cooling stop temperature of 360° C. or higher and 520° C. or lower at a cooling rate of an average cooling rate of 15° C./sec or faster,
second cooling of slowly cooling the hot-dip plating layer from the rapid cooling stop temperature to 335° C. at a cooling rate of 5° C./sec or slower, and
third cooling of rapidly cooling the hot-dip plating layer from 335° C. to 70° C. at a cooling rate of 70° C./sec or faster.

First, a base steel is immersed in a hot-dip plating bath. The chemical composition of the hot-dip plating bath may be appropriately adjusted so that the above-described chemical composition of the hot-dip plating layer can be obtained. In addition, the temperature of the hot-dip plating bath is also not particularly limited, and a temperature at which hot-dip plating can be carried out can be appropriately selected. For example, the plating bath temperature may be set to a value higher than the melting point of the plating bath by about 20° C. or more.

Next, the base steel is lifted from the hot-dip plating bath. The amount of the hot-dip plating layer attached can be controlled by controlling the lifting speed of the base steel. The amount of the hot-dip plating layer attached may be also controlled by carrying out wiping on the base steel to which the hot-dip plating layer has been attached as necessary. The amount of the hot-dip plating layer attached is not particularly limited and can be set, for example, within the above-described range.

In addition, the hot-dip plating layer is cooled. The cooling is composed of first cooling, second cooling, and third cooling.

In the first cooling, molten metal (hot-dip plating layer) attached to the surface of the base steel is rapidly cooled. Specifically, the molten metal is cooled in an accelerated manner to a rapid cooling stop temperature (controlled cooling stop temperature) within a temperature range of 360° C. or higher and 520° C. or lower by accelerated cooling means such as spraying of a cooling medium. The rapid cooling stop temperature is the temperature of the hot-dip plating layer when the accelerated cooling is stopped. The average cooling rate in the first cooling is set to 15° C./sec or faster. The average cooling rate in the first cooling is a value obtained by dividing the difference between the temperature of the plating bath and the rapid cooling stop temperature by the elapsed time from when the base steel is lifted from the plating bath to when the accelerated cooling is stopped.

In the second cooling, the hot-dip plating layer is slowly cooled. Specifically, the average cooling rate in a temperature range from the above-described rapid cooling stop temperature to 335° C. is set to 5° C./sec or slower. The average cooling rate in the temperature range from the rapid cooling stop temperature to 335° C. is a value obtained by dividing the difference between the rapid cooling stop temperature and 335° C. by a time required for the temperature of the hot-dip plating layer to drop from the rapid cooling stop temperature to 335° C. The above-described cooling rate can be achieved by, for example, leaving the hot-dip plating layer to the atmosphere after the accelerated cooling is stopped. However, in a case where the air temperature of a manufacturing environment is extremely low, a heat treatment may be required to decrease the temperature drop rate of the hot-dip plating layer.

In the third cooling, the hot-dip plating layer is rapidly cooled again. Specifically, the average cooling rate in a temperature range from 335° C. to 70° C. is set to 70° C./sec or faster. The average cooling rate in the temperature range from 335° C. to 70° C. is a value obtained by dividing the difference between 335° C. and 70° C. (265° C.) by a time required for the temperature of the hot-dip plating layer to drop from 335° C. to 70° C. The above-described cooling rate can be achieved by, for example, cooling the hot-dip plated steel with water when the temperature of the hot-dip plating layer lowers to near 335° C.

When the hot-dip plating layer is cooled so as to satisfy the above-described conditions, it is possible to form a hot-dip plating layer where the amount of the α phase having the $(111)_\alpha//(0001)_{MgZn2}$ orientation relationship is 25 area % or more. The present inventors presume that the reason therefor is as described below.

In the first cooling, the molten metal is rapidly cooled. This makes both the α phase and the $MgZn_2$ phase crystallize from the molten metal.

Subsequently, in the second cooling, the hot-dip plating layer in which both the α phase and the $MgZn_2$ phase have been crystallized is slowly cooled. This makes it possible to grow crystals in a state where the α phase and the $MgZn_2$ phase are in contact with each other. As a result, it is possible to align crystal orientations at the interface between the α phase and the $MgZn_2$ phase and to complete the solidification of the molten metal in a state where the $(111)_\alpha//(0001)_{MgZn2}$ orientation relationship has been established.

In the third cooling, the hot-dip plating layer containing a large amount of the α phase where the $(111)_\alpha//(0001)_{MgZn2}$ orientation relationship has been established is rapidly cooled again. This makes it possible to suppress solid-phase transformation in which an phase is precipitated from the α phase and to preserve the $(111)_\alpha//(0001)_{MgZn2}$ orientation relationship.

Examples

The effect of one aspect of the present invention will be more specifically described using examples. Here, conditions in the examples are simply examples of conditions adopted to confirm the feasibility and effect of the present invention. The present invention is not limited to these examples of the conditions. The present invention is capable of adopting a variety of conditions within the scope of the gist of the present invention as long as the object of the present invention is achieved.

Base steels were immersed in a variety of hot-dip plating baths and lifted to attach hot-dip plating layers to the surfaces of the base steels, and then the hot-dip plating layers were cooled under a variety of conditions, thereby manufacturing a variety of hot-dip plated steels. The chemical compositions of the hot-dip plating layers were as shown in Table 1A and Table 1B. In a case where the Fe content of the hot-dip plating layer was less than 0.05%, a symbol "-" is shown in Table 1A and Table 1B. Manufacturing conditions were set as shown in Table 2A and Table 2B. In addition, the metallographic structures of the plating layers were evaluated, and the results are shown in Table 3A and Table 3B. Furthermore, the powdering resistance and corrosion resistance under running water of the hot-dip plated steels were evaluated, and the results are shown in Table 4A and Table 4B.

The chemical compositions of the hot-dip plating layers and the metallographic structures of the hot-dip plating layers were evaluated by the above-described means. Some of the base steels were pre-plated with Ni before being hot-dip galvanizing. The composition of the Ni pre-plate is included in the chemical composition of the hot-dip plating layers disclosed in Table 1 and Table 1B.

The powdering resistance was evaluated by the following means. The hot-dip plated steel was V-bent at 90° using a die having a bend radius of 5 mm, and a 24 mm-wide cellophane tape was pressed against and peeled off from a V-bent valley portion. In addition, the presence or absence of powdering was visually evaluated. A hot-dip plated steel for which a powdering exfoliation powder was not attached to the tape was evaluated as "AA", a hot-dip plated steel for which a powdering exfoliation powder was slightly attached was evaluated as "A", and a hot-dip plated steel for which a powdering exfoliation powder was attached was evaluated as "B". Hot-dip plated steels having an evaluation result of A or AA were determined as steels having excellent powdering resistance.

The corrosion resistance under running water was evaluated by the following means. A test piece having a shape with dimensions of 200 mm×100 mm×0.8 mm was produced by cutting the hot-dip plated steel. A tape was stuck to 5 mm-wide ranges from the cut end surface on a surface opposite to an evaluation surface and on the evaluation surface so as to prevent contact with corrosive solutions. In addition, the test piece was placed on a table at an inclination angle of 60° with respect to the horizontal plane. In addition, a step of exposing the test piece to running water and a step of drying the test piece were alternately repeated. In the step of exposing the test piece to running water, a 0.5% NaCl solution was made to flow at a flow rate of 100 ml/min for 6 hours. In the drying step, the test piece was left to stand for 18 hours. In both steps, the testing environment was set to the atmosphere, and the temperature was held at 25° C. After 336 hours had passed, the corrosion weight loss per unit area of the plating layer was measured. A test piece for which the corrosion weight loss was 30 g/m² or less was evaluated as "AA", a test piece for which the corrosion weight loss was 60 g/m² or less was evaluated as "A", and a test piece for which the corrosion weight loss was more than 60 g/m² was evaluated as "B". Hot-dip plated steels having an evaluation result of A or AA were determined as steels having excellent corrosion resistance under running water. According to the above-described evaluation method, it is possible to determine the hot-dip plated steels having high corrosion resistance under running water to also have high flat portion corrosion resistance.

TABLE 1A

| | | Plating layer components (mass %) | | | | | | | | Other elements | |
|---|---|---|---|---|---|---|---|---|---|---|---|
| Classification | No. | Zn | Al | Mg | Sn | Si | Ca | Ni | Fe | Kind | Total (%) |
| Example | a1 | Rest | 10.00 | 3.00 | 0.08 | 0.05 | 0.10 | 0.21 | 0.10 | — | 0 |
| Example | a2 | Rest | 11.01 | 3.04 | 0.08 | 0.20 | 0.00 | 0.19 | 0.05 | Co: 0.01 | 0.01 |
| Example | a3 | Rest | 10.04 | 5.05 | 0.08 | 0.20 | 0.21 | 0.10 | 0.10 | Bi: 0.005 | 0.005 |
| Example | a4 | Rest | 12.09 | 4.96 | 0.00 | 0.20 | 0.00 | 0.00 | — | — | 0 |
| Example | a5 | Rest | 14.05 | 6.00 | 0.08 | 0.19 | 0.18 | 0.19 | 0.08 | Sb: 0.08 | 0.08 |
| Example | a6 | Rest | 16.02 | 6.09 | 2.00 | 0.00 | 0.00 | 0.20 | 0.10 | Sr: 0.05 | 0.05 |
| Example | a7 | Rest | 18.99 | 5.99 | 0.01 | 0.22 | 0.20 | 0.10 | 0.10 | — | 0 |
| Example | a8 | Rest | 19.11 | 6.07 | 0.05 | 0.18 | 0.19 | 0.22 | 0.10 | Pb: 0.02, In: 0.01 | 0.03 |
| Example | a9 | Rest | 19.24 | 7.51 | 0.00 | 0.17 | 0.20 | 0.23 | 0.15 | — | 0 |
| Example | a10 | Rest | 19.06 | 11.01 | 0.15 | 0.20 | 3.00 | 0.10 | 0.16 | V: 0.01 | 0.01 |
| Example | a11 | Rest | 20.01 | 5.08 | 0.05 | 0.22 | 0.28 | 0.21 | 0.10 | B: 0.004 | 0 |
| Example | a12 | Rest | 20.11 | 3.13 | 0.10 | 0.80 | 0.30 | 0.00 | 1.30 | Nb: 0.02 | 0 |
| Example | a13 | Rest | 20.18 | 7.70 | 0.10 | 0.21 | 0.31 | 0.18 | 0.10 | La: 0.01, Ce: 0.01 | 0.02 |
| Example | a14 | Rest | 22.43 | 8.01 | 0.10 | 0.22 | 0.30 | 0.20 | 0.10 | Ti: 0.01 | 0.01 |
| Example | a15 | Rest | 24.28 | 5.42 | 0.10 | 0.60 | 0.33 | 0.00 | 0.90 | Cu: 0.2 | 0.2 |
| Example | a16 | Rest | 28.87 | 8.05 | 0.10 | 1.29 | 0.36 | 0.16 | 1.41 | Y: 0.02 | 0.02 |
| Example | a17 | Rest | 30.00 | 10.00 | 0.10 | 2.50 | 0.30 | 0.20 | 1.30 | Cr: 0.05 | 0.05 |

TABLE 1B

| Classification | No. | Plating layer components (mass %) | | | | | | | | Other elements | |
|---|---|---|---|---|---|---|---|---|---|---|---|
| | | Zn | Al | Mg | Sn | Si | Ca | Ni | Fe | Kind | Total (%) |
| Comparative Example | b1 | Rest | 5.05 | 3.02 | 1.00 | 0.11 | 0.00 | 0.00 | 0.22 | — | 0 |
| Comparative Example | b2 | Rest | 15.05 | 2.09 | 0.70 | 0.15 | 0.00 | 0.00 | 0.30 | — | 0 |
| Comparative Example | b3 | Rest | 18.88 | 15.03 | 0.10 | 0.09 | 0.00 | 0.11 | 0.12 | — | 0 |
| Comparative Example | b4 | Rest | 19.04 | 8.06 | 0.10 | 3.00 | 0.00 | 0.24 | 0.10 | — | 0 |
| Comparative Example | b5 | Rest | 32.40 | 8.01 | 1.00 | 0.18 | 0.00 | 0.00 | 8.00 | — | 0 |
| Comparative Example | b6 | Rest | 19.04 | 8.14 | 1.00 | 0.00 | 3.50 | 0.22 | 0.08 | — | 0 |
| Comparative Example | b7 | Rest | 19.04 | 4.22 | 1.00 | 0.21 | 0.18 | 0.00 | 0.22 | — | 0 |
| Comparative Example | b8 | Rest | 19.55 | 4.00 | 1.00 | 0.24 | 0.21 | 0.19 | 0.10 | — | 0 |
| Comparative Example | b9 | Rest | 20.10 | 3.07 | 0.05 | 0.20 | 0.34 | 0.14 | 0.08 | — | 0 |
| Comparative Example | b10 | Rest | 15.24 | 8.09 | 2.50 | 0.21 | 0.30 | 0.22 | 0.13 | — | 0 |
| Comparative Example | b11 | Rest | 29.42 | 2.96 | 0.05 | 0.20 | 0.32 | 0.00 | 0.92 | — | 0 |
| Comparative Example | b12 | Rest | 22.49 | 6.05 | 0.05 | 0.24 | 0.30 | 0.16 | 1.61 | — | 0 |

Underlined parts indicate that the corresponding values are outside the scope of the present invention.

TABLE 2A

| | | Cooling conditions | | | | |
|---|---|---|---|---|---|---|
| No. | Plating bath temperature (° C.) | Average cooling rate from bath temperature to controlled cooling stop temperature (° C./sec) | Controlled cooling stop temperature (° C.) | Average cooling rate from controlled cooling stop temperature to 335° C. (° C./sec) | Cooling rate at 335° C. or lower (° C./sec) | Amount attached to single surface (g/m$^2$) |
| a1 | 410 | 15 | 360 | 5 | 70 | 116 |
| a2 | 450 | 15 | 380 | 5 | 70 | 141 |
| a3 | 500 | 15 | 410 | 5 | 70 | 101 |
| a4 | 470 | 15 | 420 | 5 | 70 | 80 |
| a5 | 470 | 15 | 410 | 5 | 70 | 55 |
| a6 | 470 | 15 | 410 | 5 | 70 | 88 |
| a7 | 480 | 15 | 420 | 5 | 70 | 76 |
| a8 | 480 | 15 | 420 | 5 | 100 | 92 |
| a9 | 480 | 15 | 420 | 5 | 70 | 66 |
| a10 | 480 | 15 | 420 | 5 | 70 | 65 |
| a11 | 500 | 15 | 395 | 5 | 70 | 66 |
| a12 | 540 | 25 | 440 | 2 | 70 | 59 |
| a13 | 510 | 15 | 450 | 5 | 70 | 95 |
| a14 | 510 | 15 | 450 | 5 | 90 | 46 |
| a15 | 515 | 15 | 420 | 1 | 70 | 20 |
| a16 | 510 | 15 | 455 | 5 | 70 | 69 |
| a17 | 510 | 15 | 460 | 5 | 70 | 76 |

TABLE 2B

| No. | Plating bath temperature (° C.) | Cooling conditions | | | | Amount attached to single surface (g/m²) |
|---|---|---|---|---|---|---|
| | | Average cooling rate from bath temperature to controlled cooling stop temperature (° C./sec) | Controlled cooling stop temperature (° C.) | Average cooling rate from controlled cooling stop temperature to 335° C. (° C./sec) | Cooling rate at 335° C. or lower (° C./sec) | |
| b1 | 420 | 15 | <u>345</u> | 5 | 70 | 42 |
| b2 | 465 | 15 | 420 | 5 | 70 | 53 |
| b3 | 495 | 15 | 460 | 5 | 70 | 55 |
| b4 | 520 | 15 | 460 | 5 | 70 | 85 |
| b5 | 580 | 15 | 490 | 5 | 70 | 115 |
| b6 | 450 | 15 | 460 | 5 | 70 | 99 |
| b7 | 510 | <u>6</u> | 460 | 5 | 70 | 55 |
| b8 | 510 | 15 | 460 | <u>15</u> | 70 | 95 |
| b9 | 510 | 15 | 460 | 5 | <u>10</u> | 43 |
| b10 | 510 | 15 | 440 | 5 | 70 | 29 |
| b11 | 560 | <u>2</u> | 410 | 5 | 70 | 99 |
| b12 | 510 | 15 | 440 | <u>15</u> | 70 | 20 |

Underlined parts indicate that the corresponding values are outside the ranges of preferable manufacturing conditions.

TABLE 3A

| No. | Ni pre-plating | Plating layer | | |
|---|---|---|---|---|
| | | α phase having grain diameter of 0.5 to 2 μm (area %) | MgZn₂ phase (area %) | Rate of α phase having grain diameter of 0.5 to 2 μm satisfying crystal orientation relationship with MgZn₂ phase (area %) |
| a1 | Present | 5 | 15 | 25 |
| a2 | Present | 16 | 20 | 45 |
| a3 | Present | 19 | 41 | 50 |
| a4 | — | 23 | 42 | 39 |
| a5 | Present | 24 | 55 | 85 |
| a6 | Present | 25 | 51 | 57 |
| a7 | Present | 26 | 59 | 95 |
| a8 | Present | 25 | 62 | 95 |
| a9 | Present | 33 | 62 | 58 |
| a10 | Present | 27 | 70 | 89 |
| a11 | Present | 37 | 40 | 90 |
| a12 | — | 45 | 23 | 35 |
| a13 | Present | 29 | 64 | 100 |
| a14 | Present | 38 | 58 | 89 |
| a15 | — | 45 | 45 | 55 |
| a16 | Present | 44 | 52 | 94 |
| a17 | Present | 45 | 53 | 92 |

TABLE 3B

| No. | Ni pre-plating | Plating layer | | |
|---|---|---|---|---|
| | | α phase having grain diameter of 0.5 to 2 μm (area %) | MgZn₂ phase (area %) | Rate of α phase having grain diameter of 0.5 to 2 μm satisfying crystal orientation relationship with MgZn₂ phase (area %) |
| b1 | — | <u>4</u> | 15 | <u>0</u> |
| b2 | — | 25 | <u>0</u> | <u>0</u> |
| b3 | Present | 27 | <u>75</u> | 95 |
| b4 | Present | 41 | 44 | 79 |
| b5 | — | 40 | 45 | <u>12</u> |
| b6 | Present | 42 | 44 | 89 |
| b7 | — | 44 | 25 | <u>10</u> |
| b8 | Present | 40 | 25 | <u>7</u> |
| b9 | Present | 41 | 20 | <u>9</u> |
| b10 | Present | 29 | 45 | 85 |
| b11 | — | 43 | 22 | <u>12</u> |
| b12 | Present | 35 | 52 | <u>11</u> |

Underlined parts indicate that the corresponding values are outside the scope of the present invention.

TABLE 4A

| No. | Powdering resistance | Corrosion resistance under running water |
|---|---|---|
| a1 | AA | A |
| a2 | AA | A |
| a3 | AA | AA |
| a4 | AA | AA |
| a5 | AA | AA |
| a6 | AA | A |
| a7 | AA | AA |
| a8 | AA | AA |
| a9 | AA | A |
| a10 | A | AA |
| a11 | AA | AA |
| a12 | AA | A |
| a13 | AA | AA |
| a14 | A | AA |
| a15 | AA | AA |
| a16 | A | AA |
| a17 | A | AA |

TABLE 4B

| No. | Powdering resistance | Corrosion resistance under running water |
|---|---|---|
| b1 | B | B |
| b2 | AA | B |
| b3 | B | B |
| b4 | B | B |

TABLE 4B-continued

| No. | Powdering resistance | Corrosion resistance under running water |
| --- | --- | --- |
| b5 | A | B |
| b6 | B | B |
| b7 | B | B |
| b8 | AA | B |
| b9 | AA | B |
| b10 | A | B |
| b11 | AA | B |
| b12 | AA | B |

In Comparative Example b1, the amount of Al in the hot-dip plating layer was insufficient. Therefore, in Comparative Example b1, the α phase was insufficient. In addition, since crystal growth occurred in a state where the α phase and the MgZn$_2$ phase were not in contact with each other, in Comparative Example b1, the proportion of the α phase having an appropriate crystal orientation relationship with the MgZn$_2$ phase was also insufficient. As a result, in Comparative Example b1, both the powdering resistance and the corrosion resistance under running water were insufficient.

In Comparative Example b2, the amount of Mg in the hot-dip plating layer was insufficient. Therefore, in Comparative Example b2, the MgZn$_2$ phase was insufficient. As a result, in Comparative Example b2, the corrosion resistance under running water was insufficient.

In Comparative Example b3, the amount of Mg in the hot-dip plating layer was excessive. Therefore, in Comparative Example b3, the brittle MgZn$_2$ phase became excessive, and both the powdering resistance and the corrosion resistance under running water were insufficient.

In Comparative Example b4, the amount of Si in the hot-dip plating layer was excessive. Therefore, a large amount of a brittle Si-based compound was formed in the hot-dip plating layer of Comparative Example b3, and both the powdering resistance and the corrosion resistance under running water were insufficient.

In Comparative Example b5, the amount of Al in the hot-dip plating layer was excessive. Therefore, in Comparative Example b5, the amount of the α phase where crystals grew in a state where the α phase was not in contact with the MgZn$_2$ phase increased, and the proportion of the α phase having an appropriate crystal orientation relationship with the MgZn$_2$ phase became small. As a result, in Comparative Example b5, the corrosion resistance under running water was insufficient.

In Comparative Example b6, the amount of Ca in the hot-dip plating layer was excessive. Therefore, a large amount of a brittle Ca-based compound was formed in the hot-dip plating layer of Comparative Example b6, and both the powdering resistance and the corrosion resistance under running water were insufficient.

In Comparative Example b7 and Comparative Example b11, the average cooling rate in the first cooling was insufficient. Therefore, in Comparative Example b7 and Comparative Example b11, crystal growth occurred in a state where the α phase and the MgZn$_2$ phase were not in contact with each other, and the proportion of the α phase having an appropriate crystal orientation relationship with the MgZn$_2$ phase was insufficient. As a result, in Comparative Example b7 and Comparative Example b11, the corrosion resistance under running water was insufficient. In addition, in Comparative Example b7, the powdering resistance was also insufficient.

In Comparative Example b8 and Comparative Example b12, the average cooling rate in the second cooling was excessive. Therefore, in Comparative Examples b8 and b12, it was not possible to sufficiently grow the α phase and the MgZn$_2$ phase in a state of being in contact with each other, and the proportion of the α phase having an appropriate crystal orientation relationship with the MgZn$_2$ phase was insufficient. As a result, in Comparative Example b8 and Comparative Example b12, the corrosion resistance under running water was insufficient.

In Comparative Example b9, the average cooling rate in the third cooling was insufficient. Therefore, in Comparative Example b9, the α phase was separated into an Al-rich α phase and a Zn-rich phase in the third cooling, and the proportion of the α phase having an appropriate crystal orientation relationship with the MgZn$_2$ phase was insufficient. As a result, in Comparative Example b9, the corrosion resistance under running water was insufficient.

In Comparative Example b10, the amount of Sn in the hot-dip plating layer was excessive. Therefore, in Comparative Example b10, a Sn-based compounds having low corrosion resistance was formed, and the corrosion resistance under running water was insufficient.

On the other hand, the examples according to the present invention, in which the chemical composition and metallographic structure of the hot-dip plating layer were appropriately controlled, were excellent in terms of powdering resistance and corrosion resistance under running water.

BRIEF DESCRIPTION OF THE REFERENCE SYMBOLS 1 hot-dip plated steel
11 base steel
12 hot-dip plating layer

The invention claimed is:
1. A hot-dip plated steel comprising:
a base steel; and
a hot-dip plating layer disposed on a surface of the base steel,
wherein a chemical composition of the hot-dip plating layer is, by mass %,
Al: 10.00% to 30.00%,
Mg: 3.00% to 12.00%,
Sn: 0% to 2.00%,
Si: 0% to 2.50%,
Ca: 0% to 3.00%,
Ni: 0% or more and less than 0.25%,
Cr: 0% or more and less than 0.25%,
Ti: 0% or more and less than 0.25%,
Co: 0% or more and less than 0.25%,
V: 0% or more and less than 0.25%,
Nb: 0% or more and less than 0.25%,
Cu: 0% or more and less than 0.25%,
Mn: 0% or more and less than 0.25%,
Bi: 0% or more and less than 5.000%,
In: 0% or more and less than 2.00%,
Y: 0% to 0.50%,
La: 0% or more and less than 0.50%,
Ce: 0% or more and less than 0.50%,
Fe: 0% to 5.00%,
Sr: 0% or more and less than 0.50%,
Sb: 0% or more and less than 0.50%,
Pb: 0% or more and less than 0.50%, and
B: 0% or more and less than 0.50%,
a remainder includes Zn and impurities, a metallographic structure of the hot-dip plating layer contains 5 to 45 area % of an α phase having a grain diameter of 0.5 to 2 μm, the metallographic structure of the hot-dip plating layer contains 15 to 70 area % of a $MgZn_2$ phase, and among the α phase having the grain diameter of 0.5 to 2 μm, an area ratio of the α phase having a $(111)_\alpha//(0001)_{MgZn2}$ orientation relationship to the adjacent $MgZn_2$ phase is 25% to 100%.

2. The hot-dip plated steel according to claim 1, wherein, among the α phase having the grain diameter of 0.5 to 2 μm, the area ratio of the α phase having the $(111)_\alpha//(0001)_{MgZn2}$ orientation relationship to the adjacent $MgZn_2$ phase is 60% to 100%.

3. The hot-dip plated steel according to claim 2, wherein the chemical composition of the hot-dip plating layer is, by mass %, Mg: 5.00% to 8.00%, and Sn: 0.05% to 2.00%.

4. The hot-dip plated steel according to claim 1, wherein the chemical composition of the hot-dip plating layer is, by mass %, Mg: 5.00% to 8.00%, and Sn: 0.05% to 2.00%.

\* \* \* \* \*